INVENTOR
CLAIRE N. BREWER
BY Scrivener & Parker
ATTORNEYS

INVENTOR
CLAIRE N. BREWER

BY Scrivener & Parker
ATTORNEYS

March 6, 1956 C. N. BREWER 2,737,240

AUXILIARY OPERATING MECHANISM FOR TYPESETTING, TYPECASTING AND SIMILAR MACHINES

Filed Dec. 11, 1953 4 Sheets-Sheet 3

INVENTOR
CLAIRE N. BREWER

BY Scrivener & Parker
ATTORNEYS

INVENTOR.
CLAIRE N. BREWER
BY
Scrivener + Parker
ATTORNEYS

United States Patent Office 2,737,240
Patented Mar. 6, 1956

2,737,240

AUXILIARY OPERATING MECHANISM FOR TYPESETTING, TYPECASTING AND SIMILAR MACHINES

Claire N. Brewer, Huntington, W. Va., assignor to Unitypo, Inc., Indianapolis, Ind., a corporation of New York Application December 11, 1953, Serial No. 397,737

7 Claims. (Cl. 164—112)

The invention described herein is an improvement on that described in my United States Letters Patent No. 2,679,902 for Auxiliary Keyboard and Operating Mechanism for Typesetting, Typecasting, Message Transmission, Tape Perforating and Similar Machines.

The invention of this application and the aforesaid patent relates broadly to the operation of typesetting, typecasting and similar machines and, while the invention is useful in the operation of the keyboards of all such machines, it will be particularly described in this application, as it is in the patent, in connection with, and as applied to, a machine which perforates tape which is used in the operation and control of a machine which sets or casts type or performs both operations, such as the Linotype, Intertype and Monotype machines.

Such machines as the Linotype machine are equipped with a special keyboard usually having ninety keys, although sometimes a greater and sometimes a smaller number of keys are provided, and these complex machines must be operated by highly skilled personnel who are able to operate the special keyboard and perform other duties essential to most efficient operation. It has heretofore been proposed to operate such typesetting and typecasting machines by means of a perforated tape prepared on a machine having a keyboard which corresponds to the standard typewriter keyboard with the addition of certain keys for performing operations and producing characters which are necessary in printing but not in typewriting. Such tape-perforating machines are now available commercially, a typical one being known as the Teletypesetter, and these machines produce a tape which is perforated with holes arranged in a characteristic pattern for each character key. The keyboard of such a machine has all of the character keys of the conventional typewriter keyboard and may be arranged in the same positions, and also has additional keys which are required for printing but are not required for typewriting. In addition, the keyboard has a shift key and an unshift key, each of which, when operated, produces a characteristic tape perforation which causes the typesetting or casting machine operated and controlled by the tape to set or cast upper case or lower case characters corresponding to subsequent tape perforations, depending on which of the shift and unshift keys has been last operated. Thus, for example, operation of the "A" key will always produce the same characteristic tape perforation, but the typesetting machine controlled and operated by the tape will set an upper case "A" or a lower case "a" depending on whether the shift or unshift key was last operated prior to operation of the "A" key.

In my patent referred to above, I have described and claimed means, including a keyboard having keys positioned and arranged substantially as in a standard Linotype machine keyboard, for association with a tape-perforating machine such as the Teletypesetter which will, upon operation of the keys of such keyboard, actuate the keys of the tape-perforating machine to perforate the tape in the normal manner of operation of the tape-perforating machine, thus permitting operation of tape-perforating machines such as the Teletypesetter by skilled Linotype operators who are able to perform the many and varied duties required in composing and printing. In this keyboard there are separate keys for the upper and lower cases of each character instead of a single key for both cases as in the tape-perforating machine. For example, there is an upper case "E" key and a separate lower case "e" key. In addition, there are separate keys for various characters such as punctuation marks, etc., some of which are lower case and some of which are upper case on the tape-perforating machine and consequently, on that machine, require depression of the shift key or the unshift key before any of these may be operated to produce the desired character. In addition, there are other keys on the Linotype keyboard which correspond to keys on the tape-perforating machine keyboard which cause the same character to be set and cast regardless of whether the shift key or unshift key has been previously depressed. These are referred to as the no-shift keys of the Linotype keyboard.

In the invention described in this application and in my patent the shift and unshift keys of the tape-perforating machine keyboard are operated by solenoids which are energized by electric circuits which are opened, and therefore de-energized, upon downward movement of the shift or unshift key, respectively, to permit the operated key to return to its normal position. It is essential that these circuits remain closed for a sufficient period of time to permit full depressions of the shift or unshift key and consequent full operation of the mechanism of the tape-perforating machine which produces the characteristic shift or unshift tape perforations. Accordingly, it has been an object of this invention, to provide means for retarding the movement of the means which, upon operation of the shift or unshift key, opens the circuit of the operating solenoid for the shift or unshift key.

In the inventions of this application and my patent the operation of any upper or lower case character key of the Linotype keyboard first energizes the circuit of the operating solenoid of the shift or unshift key and then the operating circuit of the character key. The switches controlling these two circuits are closed in sequence and, in practice, it may be found that they are closed in such rapid sequence that the character key circuit will be closed before the shift or unshift key has completed its full movement and has caused proper operation of the tape-perforating machine mechanism. It has accordingly been an object of this invention to provide means for opening the circuit of the operating solenoids of all of the character keys instantaneously upon operation of the shift or unshift key.

In the device described and claimed in the aforesaid patent, means are provided which are operable upon operation of, for example, an upper case character key of the Linotype keyboard to first depress the shift key of the tape-perforating machine keyboard and then, after a time delay, to depress the character key of the same keyboard corresponding to the operated key of the Linotype keyboard, thus producing a tape perforation corresponding to the desired character, which will cause the typesetting machine to set an upper case character because of the prior operation of the shift key. The same sequence of operations takes place if a lower case character key of the Linotype keyboard is operated, except that in this case the unshift key of the tape-perforating machine keyboard is depressed before the time delay operation and the subsequent depression of the character key of the tape-perforating machine keyboard. The time delay between the depression of the shift or unshift key and a character key of the tape-perforating machine keyboard is most important and must be of sufficient duration to permit full operation of the shift or unshift key and the consequent movement of the mechanism of the tape-perforating machine, before depression of the character key of the tape-perforating machine keyboard. Therefore, one of the principal objects of the present invention has been to provide improved means for providing this time delay, and this object is achieved by means disclosed in this application, which are so operable that a time delay of definite duration is provided, which is sufficient to permit all of the described operations.

In the device described and claimed in my patent each of the keys of the tape perforating-machine keyboard is operated by the plunger of a solenoid which, in the disclosed embodiment, is positioned above the key which it is intended to operate, and an additional solenoid is provided for each of the shift and unshift keys to provide additional power for the operation of these particular keys, the plungers of these supplemental solenoids being connected to their associated keys by lost motion connections which permit manual operation of the shift and unshift keys. An object of the present invention has been to provide improved means for providing additional power for the operation of the shift and unshift keys, which means will be more efficacious for this purpose than the solenoids and plungers of the embodiments disclosed in the copending application, and which will not include the lost motion connections between the plungers and keys.

The keyboard of tape-perforating machines now in general use has certain keys which are used only in specific operations and not in others. For example, it has so-called QR (quad right) and QL (quad left) keys, which are used only in perforating tape for typesetting, and "bell" and "paper feed" keys which are used only in perforating tape for use in the operation of typing machines, such as teletypewriters. An object of the present invention has been to provide on the Linotype keyboard which is associated with the tape-perforating machine keyboard, keys which when operated will provide either of the described operations, together with means for selecting the desired operation. Thus, for example, according to this invention a QR key may be provided on the Linotype keyboard, together with means for selectively causing depression of this key to perform either the "quad right" operation or the "bell" operation. Similarly, the QL key and its associated selecting means may be used to perform either the "quad left" or the "paper feed" operation.

Other objects and features of novelty of my invention will be made apparent by the following description and the annexed drawings, in which.

In my patent which is referred to above I have disclosed an enclosing and supporting structure which fits over the keyboard of a tape-perforating machine and has a cover which is positioned sufficiently above the keys of the tape-perforating machine keyboard to permit a plurality of vertically arranged solenoids to be positioned within the structure beneath the cover with the lower end of each one sufficiently above the upper surface of one of the keys of the tape-perforating machine keyboard to permit the downward movement of the plunger of the solenoid to operate a key below it upon energization of the solenoid. A keyboard base plate is provided as a part of this structure and is inclined downwardly and forwardly from the part thereof which covers the keyboard of the tape-perforating machine and supports the solenoids. The keyboard base plate is preferably a flat sheet of metal and supports the keys which substantially correspond in number and arrangement to the keys of a conventional Linotype beyboard as described above. The plunger of each solenoid is normally held by a spring in a raised position out of engagement with the key below it and upon energization of the solenoid winding is moved downwardly against the force of the spring into engagement with the key of the tape-perforating machine which is below it to depress such key and cause a corresponding and pre-determined perforation of the tape. Means are provided in the patent which are operable upon depression of any upper case character key of the Lonotype keyboard to first cause the shift key of the tape-perforating machine to be depressed and then immediately released, thus producing the characteristic "shift" tape perforation, and then, after a time delay, to cause the corresponding letter key of the tape-perforating machine keyboard to be depressed to produce its characteristic tape perforation. These means are also operable upon depression of any lower case character key of the Linotype keyboard to first cause the unshift key of the tape-perforating machine to be depressed and then immediately released, thus producing the characteristic "unshift" tape perforation and then, after a time delay, to cause the corresponding letter key of the tape-perforating machine keyboard to be depressed to produce its characteristic tape perforation. These means are also operable, upon depression of any no-shift key of the Linotype keyboard bearing a character corresponding to a key of the tape-perforating machine which produces a tape perforation causing setting of the same character regardless of whether the shift or unshift key has been previously operated, to cause the corresponding key of the tape-perforating machine keyboard to be operated.

Figure 1:
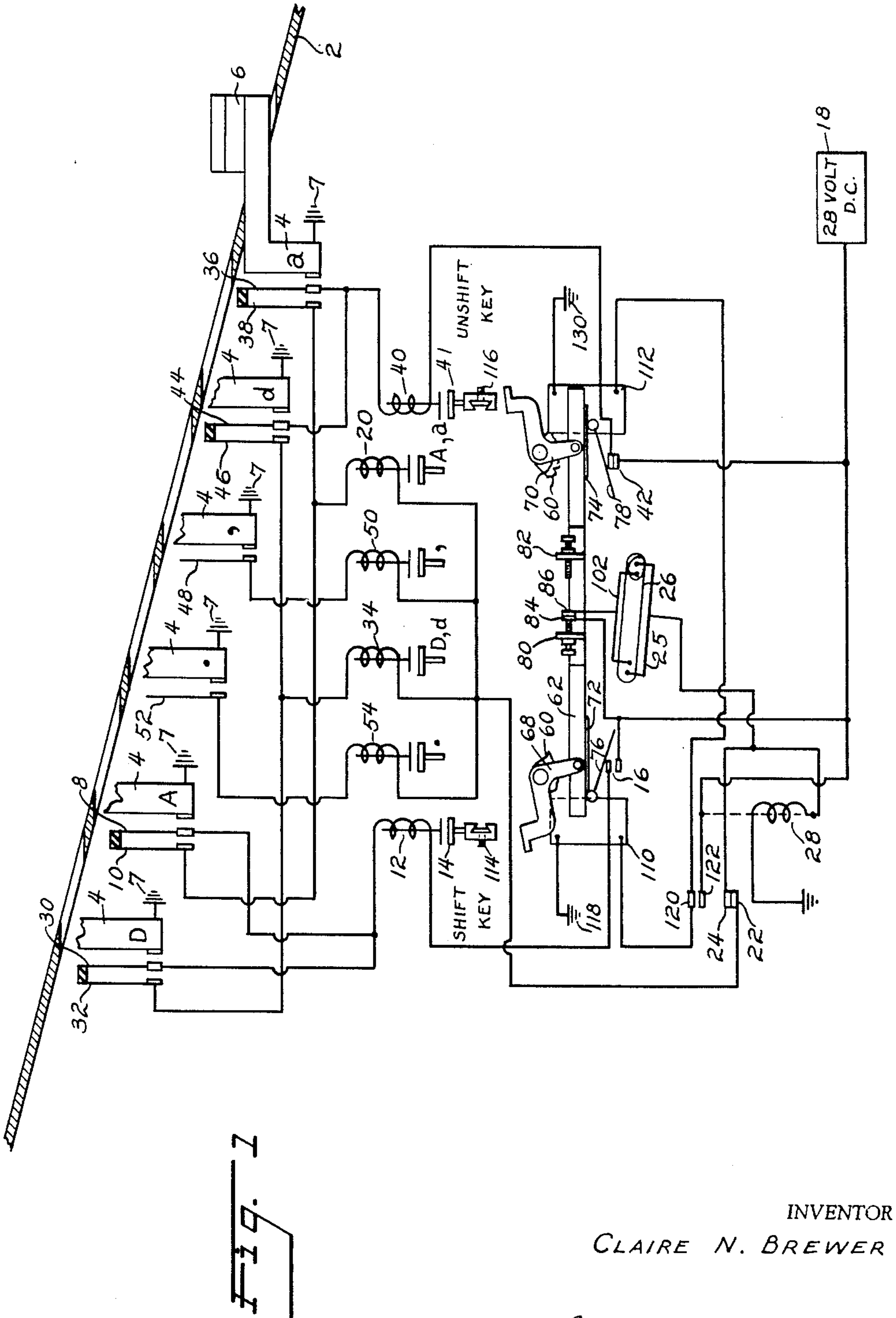
Fig. 1 is a circuit diagram of a preferred embodiment of the invention.

The improved means according to the present invention for operating the keyboard of the tape-perforating machine through the medium of the superimposed Linotype keyboard are disclosed in the drawings of this application, in which there is disclosed a section of the keyboard base 2, beneath which are shown the depending lower arms 4 of six of the keys 6, only one of which keys is fully shown in Fig. 1. Two of these arms, which are marked with the letters A and D, form part of the "A" and "D" keys of the Linotype keyboard of this invention and are both upper case letters. Two of the arms 4 are respectively marked by a comma and a period and form part of the "comma" and the "period" keys of the keyboard 2. The "comma" and "period" keys of the keyboard of the tape-perforating machine, when operated, will produce tape perforations which will cause the typesetting machine to set a comma or period regardless of whether the shift or unshift key has been previously operated. These keys of the superimposed keyboard are therefore referred to as no-shift keys. The two remaining arms 4 shown in Fig. 1 form part of the lower case "a" and "d" keys of the superimposed keyboard and are, respectively, marked with these letters and are lower case letter keys.

The arms 4 marked A and D in Fig. 1 represent the arms 4 of all of the upper case character keys of the keyboard of this invention and which are operated when it is desired to set an upper case character through the medium of the tape-perforating machine. The arms 4 marked with a comma and a period are representative of all of the arms 4 of all of the keys of the keyboard of this invention which bear a character corresponding to one of the keys of the tape-perforating machine keyboard which, when operated, produce a tape perforation causing the same character to be set regardless of whether the shift or unshift key has been previouly operated. The arms 4 marked with the lower case letters "a" and "d" are representative of all the arms 4 of all the keys of the keyboard of this invention which are operated when it is desired to cast a lower case character through the medium of the tape-perforating machine. All of the keys of the superimposed keyboard 2 are operative in the same manner and through the same circuits as will be now described with reference to the representative keys which are actually illustrated in Fig. 1 of the drawings.

Referring first to the "A" key of the superimposed keyboard 2, the arm 4 of which is shown in Fig. 1, it will be seen that this arm is grounded to the machine frame at 7, as are all of the arms 4. Two spaced, insulated, flexible contact members 8, 10 are supported adjacent the A arm 4 in the direction in which the arm will move when the key is depressed, whereby the arm, in so moving, will first engage contact member 8 and then move the same into engagement with the contact member 10. Contact member 8 is electrically connected to one terminal of the winding of solenoid 12 which is positioned above and operates the shift key 14 of the tape-perforating machine, the other terminal of such winding being connected through micro-switch 16 to a source of direct current 18. The second contact 10 is electrically connected to the winding of solenoid 20 which is positioned above and the plunger of which is operative to depress the "A, a" key of the tape-perforating machine, the other terminal of the winding being connected to a contact member 22 which is associated with a second contact member 24 which is connected to one set of contacts 25 of a mercury switch 26, which will be described hereinafter. The contact members 22, 24 form part of and are operated into and out of engagement with each other by a relay 28, one terminal of the winding of which is grounded and the other terminal of which is connected to contacts 25 of mercury switch 26. The relay 28 also operates two other contacts 120, 122, the function and connection of which will be described hereinafter. The various contact members operated by relay 28 are so related that contacts 22, 24 are engaged and contact members 120, 122 are disengaged when the relay is energized, and disengaged and engaged, respectively, when the relay is de-energized.

Each upper case letter key of the keyboard 2 has associated with it two contact members corresponding in position and function to the contact members 8, 10 which are associated with the "A" letter key, the first of such contact members being connected in every case to the winding of shift key solenoid 12 and the second being connected to the winding of the solenoid which is positioned above and operates the corresponding letter key of the tape-perforating machine. Thus, two spaced, flexible, insulated contact members 30, 32 are positioned in the path of movement of arm 4 of the upper case "D" key and are engaged in the same manner as described above in connection with the "A" key. Contact member 30 is connected to one terminal of the winding of shift key operating solenoid 12 and the second contact member 32 is connected to one terminal of the winding of the solenoid 34 which is positioned above and operates the "D, d" letter key of the tape-perforating machine, the other terminal being connected to the contact member 22.

Referring now to the lower case letter key "a" of the keyboard 2, it will be seen that the arm 4 of this key has associated with it two spaced, flexible, insulated contact members 36, 38 which are arranged in the path of movement of the arm to be successively engaged as the "a" key is depressed. The contact 36, which is nearest the arm 4 of the "a" key, is connected to the winding of the solenoid 40 which is positioned above and operates the unshift key 41 of the tape-perforating machine, the other terminal of the winding being connected through micro-switch 42 to the source of power 18. The second contact 38 is connected to the winding of the solenoid 20 which is positioned above and operates the "A, a" key of the tape-perforating machine, the other terminal of the winding being connected to contact member 22 which has been described before.

Each lower case letter key of the keyboard 2 has associated with it two contact members corresponding in position and function to the contact members 36, 38 which are associated with the lower case "a" letter key of such keyboard, the first being connected in every case to the winding of the unshift key solenoid 40 and the second being connected to the winding of the solenoid which operates the corresponding letter key of the tape-perforating machine. Thus, two spaced, flexible insulated contact members 44, 46 are positioned in the path of movement of arm 4 of the lower case "d" key and are engaged in the same manner as the contact members 36, 38 are engaged by the arm 4 of the "a" key. Contact member 44 is connected to one terminal of the winding of the unshift key operating solenoid 40 and the second contact member 46 is connected to one terminal of the winding of the solenoid 34 which is positioned above and operates the "D, d" key of the tape-perforating machine, the other terminal of the winding being connected to the contact member 22.

Referring now to the "comma" key of the keyboard 2, it will be seen that the arm 4 of this key has associated with it a single contact member 48 which is normally spaced from the arm 4 and is positioned to be engaged by it upon operation of the key of which arm 4 forms a part. Contact 48 is connected to the winding of solenoid 50 which is positioned above and the plunger of which operates the "comma" key of the tape-perforating machine, the other terminal of the winding being connected to contact member 22.

Each no-shift key of the keyboard 2 has associated with it one contact member corresponding in position and function to the contact member 48 which is associated with the "comma" key, and each such contact member is connected directly to the solenoid which is positioned above and the plunger of which operates the corresponding key of the tape-perforating machine. Thus, a contact member 52 is associated with the arm 4 of the "period" key of the keyboard 2 and is normally spaced from it but is positioned to be engaged by the arm on operation of the "period" key. This contact member 52 is connected to the winding of solenoid 54 which is positioned above and the plunger of which operates the "period" key of the tape-perforating machine, the other terminal of the winding being connected to contact 22.

A flat, elongated, vertically arranged supporting plate 60 (only partially shown in Figs. 1 and 5 but see Figs. 2 and 3) is positioned below the shift and unshift keys 14, 41 and supports a horizontal bar 62 which is mounted for horizontal sliding movement between adjustable stops 64, 66 mounted on opposite ends of the plate. Two right angular levers 68, 70 are pivotally mounted beteen their ends on the plate adjacent the opposite ends thereof and above the bar 62, each of which levers has a depending arm which is pivotally connected to the bar and an upwardly-extending arm which is positioned below the shift or unshift key and is adapted to be engaged thereby on downward movement of one of the other of these keys. Two cam plates 72, 74 are integrally or otherwise attached to the lower surface of bar 62 below the pivotal connections of levers 68, 70 thereto, respectively. Below one end of the bar, in position to be engaged and disengaged by cam plate 72 as the bar moves back and forth horizontally, is a flexible member 76 which is positioned above the contact of micro-switch 16 and which is operable to close these contacts when engaged by the cam plate. A similar flexible member 78 is positioned below the other end of the bar in position to be engaged and disengaged by the cam plate 74 and which operates the two contacts of micro-switch 42 to close the same when engaged by plate 74. Mounted on the upper edge of the bar 62 are two spaced abutment members 80, 82 which are electrically insulated from the bar and between these are two flexible mounted, separated contact members 84, 86 which are mounted on the plate, but insulated therefrom, in such positions with respect to each other and to the abutment members 80, 82 that they are moved into engagement with each other by one or the other of the abutment members as the bar 62 moves horizontally with respect to the plate 60. Contact 84 is connected to the source of energy 18 and contact 86 is connected to the connected contacts 102 of mercury switch 26. Extending upwardly from the bar is a plate 88 (not shown in Figs. 1 and 5 but see Figs. 2 and 3) having a recess in its upper edge which receives a pin 90 which is mounted on an arm 92 which extends upwardly from a plate 94 which is pivotally mounted on the rear face of plate 60 and which has two arms 96, 98 extending in opposite directions therefrom toward the ends of plate 60 and the purpose and function of which will be described hereinafter. Mounted on the plate 94 for rocking movement therewith is the mercury switch 26 which has two contact members at each end thereof, each of which is connected to one contact at the other end.

The operation of the described apparatus and circuits will now be described. If the parts are in the positions and relations shown in Fig. 1, it will be seen that the shift key 14 was the last of the shift and unshift keys to have been depressed, and the bar 62 is therefore in its most extended position to the right as viewed in Fig. 1 having been moved to such position by operation of lever 68 upon depression of the shift key. The upper end of lever 68 is depressed and the upper end of lever 70 is raised in position to be engaged on any subsequent downward movement of the unshift key 41. The cam plate 74 is in engagement with flexible member 78, while cam plate 72 is out of engagement with flexible member 76. The contacts of micro-switch 42 are therefore closed and those of micro-switch 16 are open. Mercury switch 26 is in tilted position and therefore passes current between contacts 25 and 102. Contacts 84, 86 have been closed by abutment 80, completing a circuit from the source of energy 18, through contacts 84, 86, the mercury switch, and relay winding 28, thus energizing the relay winding to close contacts 22, 24 and open contacts 120, 122.

If an upper case character key, such as the "D" key, of the keyboard 2, is now operated, the arm 4 of the key will move first into engagement with contact 30 which is connected to the shift key solenoid winding 12, but as this winding is connected to one of the contacts of micro-switch 16, which are open, no circuit will be completed and the tape-perforating machine mechanism will continue to produce perforations preceded by an upper case perforation. As the arm 4 of the "D" key continues its movement it will engage contact 32 and a circuit will be completed from the grounded arm, through contact 32, the winding of solenoid 34 which operates the "D" letter key of the tape-perforating machine, through closed contacts 22, 24, through the mercury switch contacts 25, 102, which are connected because the mercury switch is in tilted position, through contacts 86, 84, to the source of energy 18, thus energizing the solenoid winding 34 and operating the "D" key of the tape-perforating machine to produce a characteristic tape perforation which will, in turn and when the tape operates a type-setting machine, cause an upper case "D" to be set by reasons of the fact that a shift key perforation was the last shift or unshift key perforation to be made.

If a lower case character key, such as the "a" key, of the keyboard 2 is now operated, the arm 4 of the key will first move into engagement with contact 36, thus completing a circuit from the grounded arm 4, through contact 36, unshift key solenoid winding 40, and the closed contacts of micro-switch 42 to the source of energy 18, thus energizing the winding 40 and operating the unshift key 41 which thereupon moves downwardly and engages the upper arm of lever 70 which thereupon moves clockwise about its pivotal support on plate 60 and moves the sliding bar 62 toward the other end of the plate 60, or to the left as viewed in Fig. 1. This movement of bar 62 causes the following operations. First, the cam plate 74, which is mounted on bar 62 below the lever 70 moves away from the flexible member 78, allowing this member to move upwardly and open the micro-switch 42. At the same time the cam plate 72 at the other end of bar 62 moves onto the flexible member 76, depressing it and closing micro-switch 16. Also, the abutment 80, which is carried by the bar, moves away from contact member 84 and contact members 84, 86 separate and remain apart until contact 86 is engaged by approaching abutment member 82, whereupon contact members 84, 86 are again closed. The bar 62 carries plate 88 with it and the pin 90 is therefore moved in the same direction as the bar. This causes the plate 94 to rock about its pivotal support on plate 60 and thus also causes the mercury switch 26 to rock, thus moving the mercury within it from one end of the glass capsule of the mercury switch to the other which, of course, requires a definite, substantial period of time. As the mercury switch will pass current only in its fully tilted position, in one direction or the other, the circuit of the winding of relay 28 is broken during movement of the mercury switch from one tilted position to the other and during the period of such movement the circuits connecting the character key operating solenoids to power are therefore open at contacts 22, 24.

The foregoing operations are initiated by engagement of the arm 4 of a lower case character key of the keyboard 2 with the first contact which the arm engages when the key is depressed such as, for example, the contact 36 which is first engaged by the arm 4 of the "a" key. As stated above, the movement of bar 62 upon depression of the unshift key causes micro-switch 42 to open and micro-switch 16 to close. The former controls the connection of the unshift key solenoid to power and when the cam plate 74 moves away from flexible member 78 this solenoid is de-energized. The cam plate must therefore be sufficiently long to maintain the micro-switch 42 closed for sufficient time to permit the solenoid 41 to operate the unshift key, and the same is true of the cam plate 72 which controls micro-switch 16. The micro-switch 16 controls the connection of the shift key solenoid to power and the closing of this micro-switch upon movement of the bar 62 to the left merely permits connection of the shift key solenoid to power upon later operation of any upper case character key of the keyboard 2.

The operation of the mercury switch provides a definite, substantial interval between the operation of the shift or unshift key and the operation of a character key of the tape-perforating machine in order to permit complete operation of the shift or unshift mechanism of the latter machine before the character key is operated. The mercury switch is tilted in one direction at any time when the shift key has been operated and is tilted in the other direction at any time when the unshift key has been operated, the former condition being shown in Fig. 1. The mercury within the switch connects the contacts thereof whenever the switch is in fully tilted position in either direction, but in other positions of the switch does not connect the contacts. Thus, the switch passes current only when in fully tilted position. However, when the switch is moved out of fully tilted position the mercury does not instantaneously break the connection between the switch contacts and, as instantaneous opening of the circuits of the character key operating solenoids is necessary, the contact members 84, 86 are provided. As described, these are mounted on the plate 60, are in very close proximity but normally separated, and are brought together when either one is engaged by one of abutment members 80, 82 which are mounted on bar 62 on opposite sides of them. The abutments 80, 82 are so adjusted with respect to contact members 84, 86 that any slight movement of the bar 62 will move one or the other of the abutments away from the contact member with which it is in engagement. Thus, as the bar moves from its right-hand position to its left-hand position upon operation of the unshift key, the abutment 80 will move away from contact member 84 which will instantaneously move out of engagement with contact member 86, such instantaneous separation being permitted by means which are described hereinafter. It will be seen, therefore, that upon operation of the unshift key, the consequent movement of bar 62 to the left will immediately and instantaneously move contacts 84, 86 out of engagement with each other, thus immediately breaking the circuit from the source of energy, contacts 84, 86, the mercury switch and the relay winding 28, thus de-energizing the relay and causing contacts 22, 24 to open and contacts 120, 122 to close. The opening of contacts 22, 24 opens the circuit between the operating solenoid of each character key of the tape-perforating machine keyboard and the source of energy, thus preventing the operation of these solenoids until the relay winding 28 is again energized to close contacts 22, 24. This occurs when the mercury switch has completed its movement from one tilted position to the other which in turn, occurs when the bar 62 has completed its horizontal sliding movement caused by the operation of lever 68 or 70 by depression of the shift or unshift key.

Figure 2:
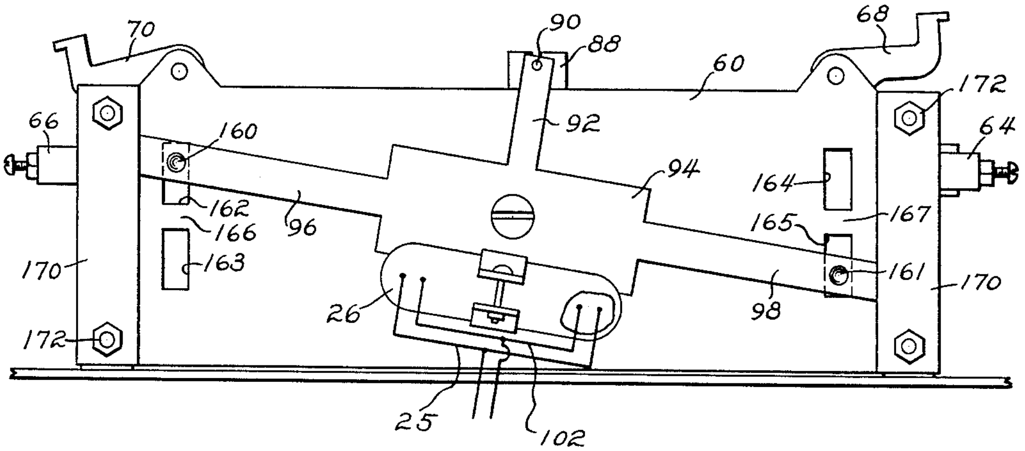
Figs. 2 and 3 are plan views of switch and other mechanisms according to the invention and parts of which are shown diagramatically in Fig. 1.
Figures 3, 4:
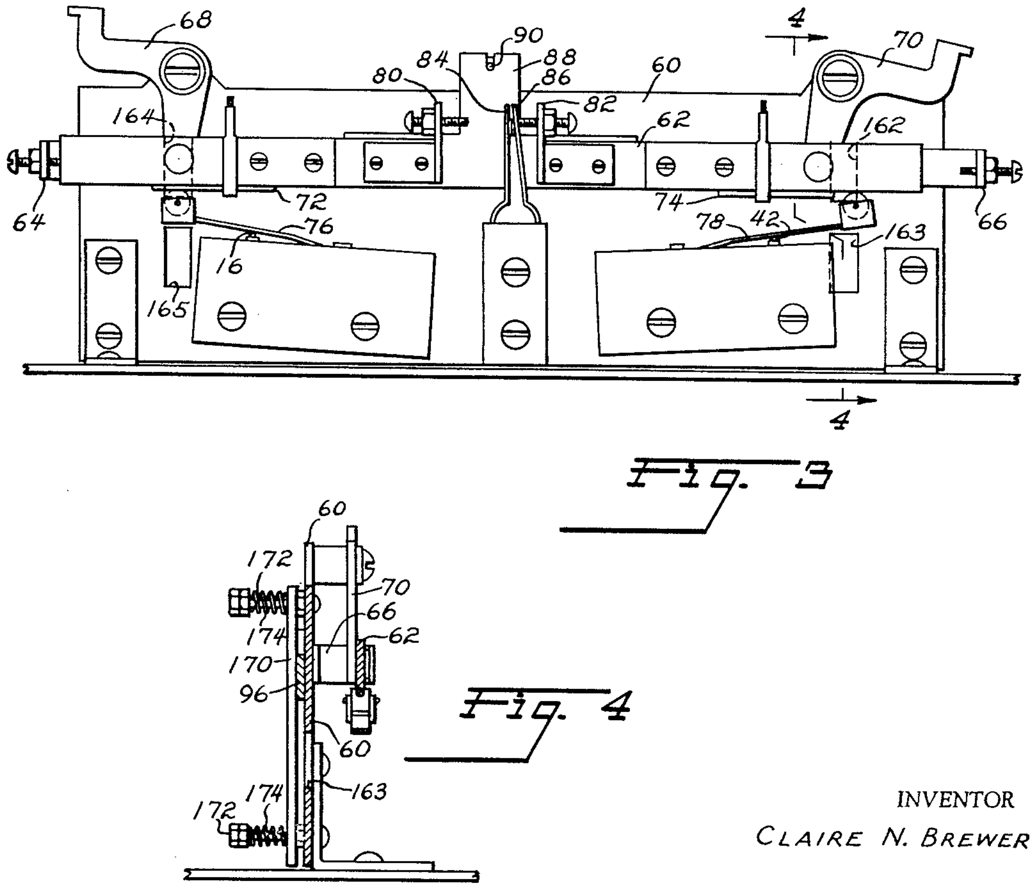
Fig. 4 is a sectional view taken on line 4—4 of Fig. 3.

I have found that unless corrective means are provided the initial engagement of lever 68 or 70 by the shift or unshift key, when either of such keys is operated, will cause the bar 62 to travel freely and so rapidly that the micro-switch 16 or 42 which controls the circuit of the solenoid of the operated shift or unshift key will be opened, by removal of cam plate 72 or 74 from flexible member 76 or 78, before the operated shift or unshift key has completed its movement and the necessary resultant operations of the tape-perforating machine have been performed. Means are therefore provided by the invention for controlling the sliding movement of the bar 62 to cause it to move freely at the beginning and end of its travel and to brake its movement during the intermediate part of its travel. The effect of this is to permit rapid initial movement of the bar to effect instantaneous separation of the contacts 84, 86 with resultant instantaneous opening of the circuits of the operating solenoids of the character keys, then to retard its movement in order to keep the circuit of the shift or unshift key operating solenoid closed for a sufficient time to permit full operation of the shift or unshift key with consequent complete operation of the shift or unshift mechanism of the tape-perforating machine, and lastly to permit quick closing of the contacts 84, 86. These means are shown in Figs. 2, 3 and 4 and comprise dimples 160, 161 which are formed in the arms 96, 98, respectively, adjacent the ends thereof. These dimples are convex in the direction of plate 60 and engage the plate because of the close proximity of the arms 96, 98 thereto. Two vertically spaced apertures are formed in the plate 60 in the path of movement of each dimple, those associated with dimple 160 being numbered 162, 163 and those associated with dimple 161 being numbered 164, 165. These apertures are so spaced and related that in one tilted position of the arms 96, 98 the dimples will be in apertures 162 and 165 while in the other tilted position they will be in apertures 163 and 164. The plate and arm assembly will, of course, move freely so long as the dimples are in the apertures, thus permitting the bar 62 to move freely and quickly through the initial part of its travel to permit instantaneous opening of the contacts 84, 86 which control the relay 28, thus providing instantaneous opening of the circuits of the character key operating solenoids. When the dimples move from the apertures to the land spaces 166, 167 between them, the movement of the assembly will be braked because of the frictional drag of the dimples against the surface of the plate 60, thus preventing free sliding movement of the bar 62 and consequently preventing premature opening of the micro-switch 16 or 42 which controls the circuit of the operating solenoid of the shift or unshift key. As the dimples move from the land parts 166, 167 they will enter the other apertures and all frictional drag on the arms 96, 98 and the sliding bar will be removed, thus permitting the contacts 84, 86 to come together quickly to energize the relay 28 and re-establish the circuits of the operating solenoids of the character keys. In order to increase the frictional drag of the dimples on the land parts 166, 167 I provide two flat members 170 which are respectively positioned adjacent but inside the ends of arms 96, 98 and bear against the outer surfaces of these arms. Each of these members has two spaced apertures formed therein through which extend bolts 172 carried by plate 60 each having a nut or other abutment at its outer end. A compression spring 174 surrounds each bolt and bears at its opposite ends on the nut and on the member 170, thereby forcing this member against the arm 96 or 98 and thus, in turn, forcing the arm against the plate 60.

Figure 7:
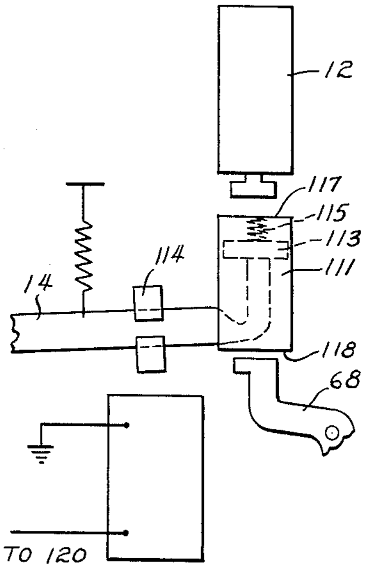
Fig. 7 is a side view showing the operating mechanism for the shift or the unshift key and the means for effecting instantaneous opening of the character key circuit upon operation of the shift or unshift key.

In the operation of certain tape-perforating machines the provision of the described braking means, namely the apertures and dimples, will be sufficient to permit substantially instantaneous opening of the contacts 84, 86 upon depression of the shift or unshift key. However, in certain types of tape-perforating machines these means for permitting free and rapid initial movement of the bar 62 will not be adequate to insure the substantially instantaneous opening of contacts 84, 86 which is required. Means are therefore provided by the present invention which are supplemental to the means already described and which will permit or cause the instantaneous opening of these contacts. These means are disclosed in Fig. 7, in which the shift key 14 is shown, together with its operating solenoid 12 and the lever 68 which is disposed beneath it and which operates bar 62. A cylindrical cover 111 is disposed over the end of the shift key and surrounds the finger-engaging part 113 thereof and the vertical part of the arm which supports it. A compression spring 115 is disposed between the upper end wall 117 of the cylindrical member and the top face of the finger-engaging part of the key and normally holds the cylindrical member in raised position with respect to the key. This spring may be compressed fully by a force less than that required to depress the key 14. The lower end wall 118 of the cylindrical member is disposed just above the upper end of the upper arm of lever 68. Upon energization of the shift key operating solenoid 12 the plunger thereof will move downwardly and engage the upper end wall 117 of the cylindrical member 111, moving it downwardly and compressing spring 115. This downward movement of the cylindrical member will cause the lower end wall 118 thereof to engage the lever 68 and move it in counterclockwise direction, thus moving the bar 62 to the right as viewed in Fig. 1 and causing the abutment 82 to move away from contact 86 to separate contacts 84, 86. This will result in de-energization of relay 28 thereby separating contacts 22, 24 and opening the circuit of all of the solenoids which operate the character keys of the tape-perforating machine. Therefore, the initial movement of bar 62 which is caused by the downward movement of cylindrical member 111 will be sufficient to cause contact members 84, 86 to separate, thus opening the circuits of all of the operating solenoids for the character key instantaneously upon depression of either the shift key or the unshift key. Further downward movement of the plunger of solenoid 12 after full compression of the spring 115 will move the shift key downwardly in the manner and with the results described before. The same means may be provided in connection with the unshift key and need not be further described.

One complete cycle of operation will now be described, it being assumed that the parts are in the positions shown in Fig. 1, in which the shift key was last operated. If the lower case "a" key of the keyboard 2 is operated, the unshift key solenoid is operated and the unshift key is depressed. It will engage the lever 70 and move it in a clockwise direction, thus moving the bar 62 to the left. Abutment 80 will immediately move away from contact 84, thus instantaneously de-energizing relay winding 28, causing contacts 22, 24 to open, thus instantaneously breaking the circuit through the solenoid 20 of the "a" letter key and preventing operation of this key. The movement of bar 62 to the left causes the mercury switch to be moved from its most tilted position in one direction to its most tilted position in the other direction and, as this movement requires a definite and substantial period of time, the mechanism of the tape-perforating machine will have sufficient time to produce an unshift perforation before the character key is operated. At the same time, the assembly of plate 94 and arms 96, 98 is moved from one tilted position to the other and the dimples 160, 161 and their associated apertures and co-operating devices permit free and rapid initial movement of the bar, after which the frictional drag of the dimples on the land parts between the apertures brakes the movement of the bar to prevent premature opening of the micro-switch 42 which controls the circuit of the operating solenoid 40 of the depressed unshift key. When the bar 62 reaches the end of its movement, where it will be stopped by the adjustable stop 64, the abutment 82 engages the contact member 86, closing the contacts 84, 86, which occurs rapidly after the dimples move from the land parts into the apertures at the completion of movement of the plate 94 and arms 96, 98. At the same time, the mercury switch completes its tilting movement and the mercury in the switch again completes the circuit between contacts 25 and 102. When the contacts 84, 86 are engaged and the contacts of the mercury switch are connected, the relay winding 28 is energized, causing the contacts 22, 24 to be connected to permit the circuit through the solenoid winding 20 of the "A, a" character key to be completed. This occurs when these circuits are closed, as the arm 4 of the "a" key of the keyboard 2 has already engaged the second contact 38, the circuit being from the grounded arm 4 through contact 38, solenoid winding 20, contacts 22, 24, mercury switch 26 and contacts 84, 86 to the source of energy 18. The "A, a" character key of tape-perforating machine is accordingly depressed, producing a characteristic tape perforation which will cause the typesetting machine to set a lower case "a" because of prior operation of the unshift key. This description of the cycle of operations following depression of a lower case character key of the keyboard 2 will be sufficient to enable those skilled in the art to understand fully and clearly the cycle of operations following the depression of any shift or unshift key of the keyboard 2.

Means are provided by the invention for supplementing the shift and unshift key solenoids 12, 40 in order to provide additional power for operation of these keys. Such means comprise electro-magnets 110, 112 which are respectively positioned below the shift and unshift keys 14, 41 and magnetizable metallic members 114, 116 of relatively large volume which are respectively attached to the arms which support the shift and unshift keys. One terminal of the winding of electromagnet 110 is grounded at 118 and the other terminal is connected to a contact member 120 which is associated with a second contact member 122 which is connected to the source of energy 18. The contact members 120, 122 are operated by relay 28 and are in engagement with each other when the relay is de-energized and are separated when the relay is energized. One terminal of the winding of electromagnet 112 is grounded at 130 and the other is connected to contact member 120. As the winding of relay 28 is normally energized, and is only de-energized during movement of the bar 62 from one position to another, and as the contacts 120, 122 are separated when the relay winding is energized, the electro-magnets will normally be de-energized and will only be energized upon operation of the shift or the unshift key and will remain energized only until the bar 62 reaches the end of its movement and the shift or unshift key is returned to its normal position by opening of micro-switch 16 or 42 with consequent de-energization of the operating solenoid of the shift or unshift key. Thus, for example, upon operation of any upper case key of the keyboard 2 the winding of relay 28 will be de-energized during movement of the bar 62, as fully described hereinbefore, and during this same period the contacts 120, 122 will be engaged, completing a circuit from ground at 118, through the winding of the magnet 110, contacts 120, 122 to the source of energy 18. Similarly, the magnet 112 will be energized upon operation of any lower case key of the keyboard 2. The members 114, 116 which are attached to the supporting arms of the shift and unshift keys act as armatures within the field of the associated electro-magnet, and co-operate with such electro-magnet to provide power additional to that provided by solenoids 12, 40 for operating the shift and unshift keys.

Figure 5:
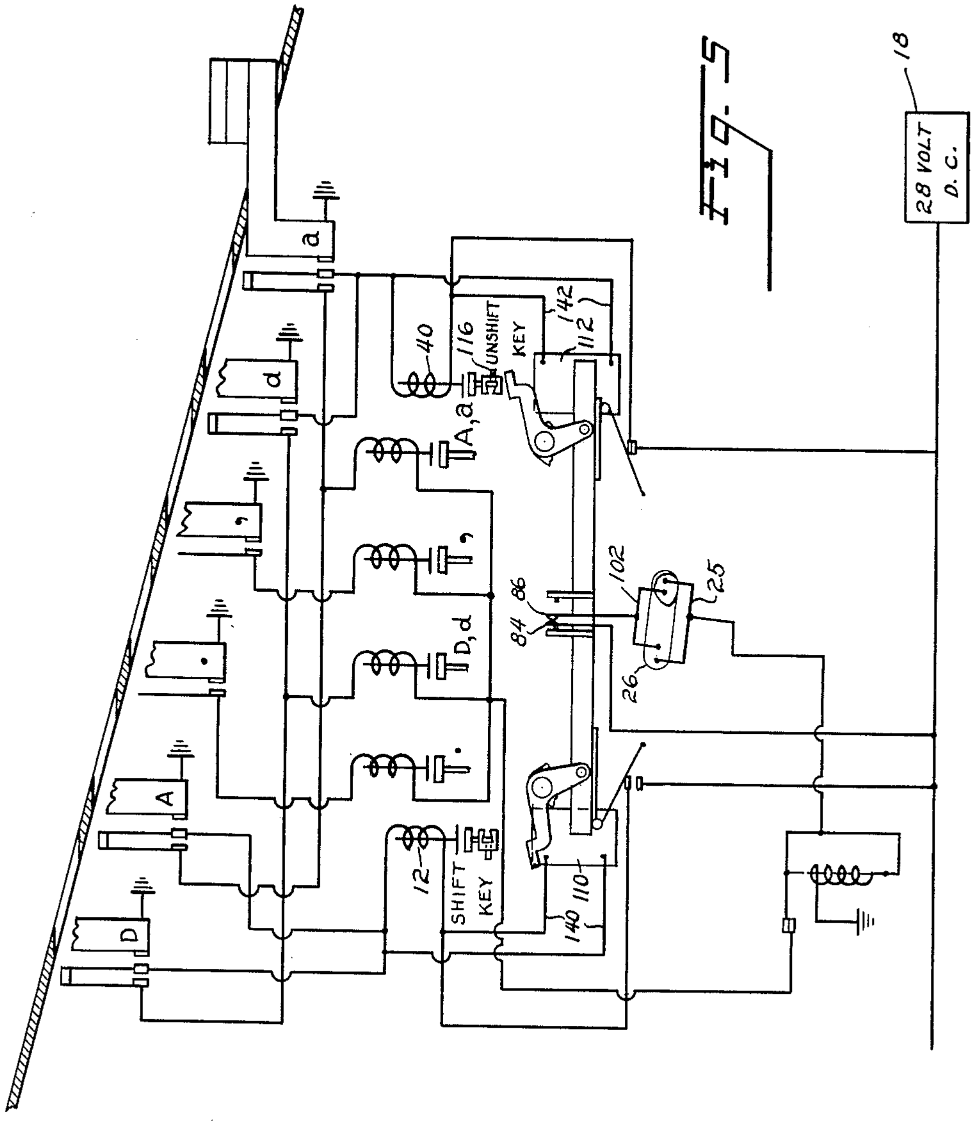
Fig. 5 is a circuit diagram which is similar to Fig. 1 but shows a different means for operating the electromagnets which provide supplemental power for the operation of the shift and unshift keys.

In another embodiment of the invention, the magnets 110, 112 which provide added power for the operation of the shift and unshift keys may be connected, respectively, in parallel with the windings of the solenoids which operate the shift and unshift keys. This connection of the magnets is shown in Fig. 5, in which the winding of electromagnet 110 is connected in parallel with the winding of the shift key operating solenoid 12 by leads 140, and magnet 112 is connected in parallel with the winding 40 of the unshift key operating solenoid by leads 142. In this form of the invention the magnets 110, 112 will be energized whenever the respective operating solenoids for the shift and unshift keys are energized, thus providing the additional power required for proper operation of the shift and unshift keys.

Figure 6:
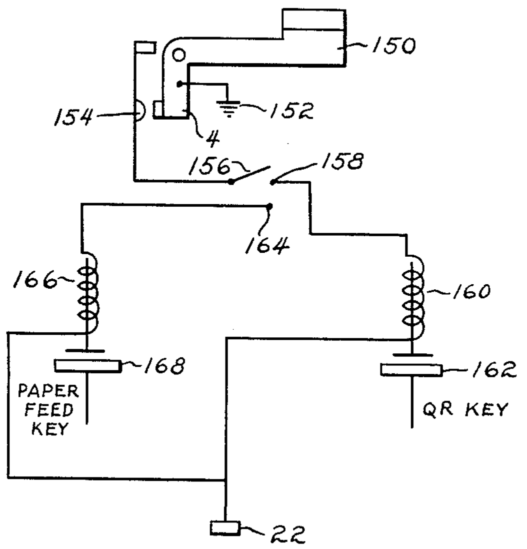
Fig. 6 is a circuit diagram showing the key and circuit arrangement for selectively performing different functions upon the operation of the single key.

The tape-perforating and similar machines which the device described and claimed in this and my co-pending applications is intended to operate may be used in typesetting or tele-typewriting operations and, as is well known to those skilled in the art, the requirements for these two types of operations are not the same. By the present invention I have provided means whereby one key of the device of this and my aforesaid patent may be used selectively to perform typesetting or tele-typewriting functions of tape-perforating or similar machines. Such means are disclosed in Fig. 6 and comprise a key 150 which is pivotally mounted on the keyboard 2 and which is grounded at 152. A contact member 154 is disposed in the path of movement of the depending arm 4 of this key and is connected to the pole 156 of a single-pole, double-throw switch. One contact 158 of this switch is connected to one terminal of the winding 160 of the operating solenoid of a key 162 of the tape-perforating machine which controls mechanism of such machine which is useful only in typesetting, which may, for example, be the so-called QR (quad right) key of the tape-perforating machine. The second contact 164 of the switch is connected to one terminal of the winding 166 of the operating solenoid of a key 168 of the tape-perforating machine which controls mechanism of such machine which is useful only in tele-typewriting but is not useful in typesetting, and which may, for example, be the so-called "paper feed" key of the tape-perforating machine. Both remaining terminals of the windings 160, 166 are connected to the contact member 22 which, as described hereinbefore, is associated with contact member 24. If the switch pole 156 is connected to contact 158 and the key 150 is depressed, a circuit will be completed from the grounded arm 150, through contact 154, switch parts 156, 158, winding 160, contacts 22, 24, mercury switch contacts 25, 102, contacts 84, 86 to the source of power 18, thus energizing solenoid winding 160 and operating the QR key. If the switch parts 156, 164 are connected an identical circuit will be established through winding 166 of the paper feed key solenoid, thus energizing this key. As the contacts 22, 24, mercury switch contacts 26, 102 and contacts 84, 86 are in engagement at all times, except during actual movement of the bar 62 following operation of the shift key or the unshift key, the circuit through either of windings 160 or 166 may be completed at any time, except during movement of the bar, by operation of the key 150. This described circuit and arrangement is representative of other circuits and arrangements by which a single key of the keyboard 2 may be used to control two functions of the tape-perforating machine.

While I have described and illustrated certain embodiments of my invention, it will be understood by those skilled in the art that other embodiments, as well as modifications of those disclosed, may be made and practiced without departing in any way from the spirit or scope of the invention, for the limits of which reference must be made to the appended claims.

What is claimed is:

1. In the combination comprising an auxiliary keyboard for a tape-perforating machine having a plurality of character keys each producing the same characteristic perforation for upper case and lower case, a shift key for producing a characteristic upper case tape perforation and an unshift key for producing a characteristic lower case tape perforation, the auxiliary keyboard comprising a plurality of spring supported keys arranged in substantially the positions of the keys of a standard Linotype machine keyboard and each being marked with an upper case or lower case character, a plurality of solenoids each having a plunger and each being arranged and positioned to be operatively associated with one of the character, shift and unshift keys of the tape-perforating machine to depress the associated key upon energization of the solenoid, a pair of contact members associated with each of the upper case and lower case keys of the auxiliary keyboard and being positioned to be successively engaged by the associated key on depression thereof, an electric circuit including the first contact member of each pair of contact members associated with an upper case key of the auxiliary keyboard and also including the winding of the shift key solenoid, an electric circuit including the second contact member of each pair of contact members associated with an upper case key of the auxiliary keyboard and also including the winding of the solenoid associated with the corresponding character key of the tape-perforating machine keyboard, an electric circuit including the first contact of each pair of contact members associated with a lower case key of the auxiliary keyboard and also including the winding of the unshift key solenoid, an electric circuit including the second contact of each pair of contact members associated with a lower case key of the auxiliary keyboard and also including the winding of the solenoid associated with the corresponding character key of the tape-perforating machine keyboard, the improvement in means for de-energizing the shift or unshift key solenoid after operation thereof, comprising an elongated bar mounted for sliding movement in a direction transverse to the direction of movement of the shift and unshift keys, two levers pivotally supported externally to said bar adjacent the ends thereof and each having an arm pivotally connected to said bar and a second arm disposed in the path of movement of the shift or unshift key whereby the bar is moved in opposite directions by depression of one or the other of said shift and unshift keys, two micro-switches which are respectively in the circuits of the operating solenoids of said shift and unshift keys, and two cam members on said bar operatively associated with said two micro-switches respectively for operating one or the other thereof to open position upon depression of the shift or unshift key with which the micro-switch is in circuit to thereby de-energize the solenoid of the depressed shift or unshift key after operation thereof.

2. In the combination comprising an auxiliary keyboard for a tape-perforating machine having a plurality of character keys each producing the same characteristic perforation for upper case and lower case, a shift key for producing a characteristic upper case tape perforation and an unshift key for producing a characteristic lower case tape perforation, the auxiliary keyboard comprising a plurality of spring supported keys arranged in substantially the position of the keys of a standard Linotype machine keyboard and each being marked with an upper case or lower case character, a plurality of solenoids each having a plunger and each being arranged and positioned to be operatively associated with one of the character, shift and unshift keys of the tape-perforating machine to depress the associated key upon energization of the solenoid, a pair of contact members associated with each of the upper case and lower case keys of the auxiliary keyboard and being positioned to be successively engaged by the associated key on depression thereof, an electric circuit including the first contact member of each pair of contact members associated with an upper case key of the auxiliary keyboard and also including the winding of the shift key solenoid, an electric circuit including the second contact member of each pair of contact members associated with an upper case key of the auxilary keyboard and also including the winding of the solenoid associated with the corresponding character key of the tape-perforating machine keyboard, an electric circuit including the first contact of each pair of contact members associated with a lower case key of the auxiliary keyboard and also including the winding of the unshift key solenoid, an electric circuit including the second contact of each pair of contact members associated with a lower case key of the auxiliary keyboard and also including the winding of the solenoid associated with the corresponding character key of the tape-perforating machine keyboard, the improvement in means for de-energizing the shift or unshift key solenoid after operation thereof, comprising an elongated bar mounted for sliding movement in a direction transverse to the direction of movement of the shift and unshift keys, two levers pivotally supported externally to said bar adjacent the ends thereof and each having an arm pivotally connected to said bar and a second arm disposed in the path of movement of the shift or unshift key whereby the bar is moved in opposite directions by depression of one or the other of said shift and unshift keys, two micro-switches which are respectively in the circuits of the operating solenoids of said shift and unshift keys, two cam members on said bar operatively associated with said two micro-switches respectively for operating one or the other thereof to open position upon depression of the shift or unshift key with which the micro-switch is in circuit to thereby de-energize the solenoid of the depressed shift or unshift key after operation thereof, and movement controlling means associated with said bar to permit free initial movement thereof in either direction, then to retard movement thereof throughout a part of its travel, and thereafter to permit free movement thereof throughout the remainder of its travel.

3. The improved combination according to claim 2, in which the movement controlling means comprises a fixed plate having two spaced apertures therein, an arm mounted for movement from an initial position overlying one of said apertures to a final position overlying the second aperture, means on said arm frictionally engaging said plate between said apertures as the arm passes from one aperture to the other, and means connecting said bar to said arm to cause movement of said arm in either direction upon operation of the shift or unshift key to move said bar from its initial to its final position.

4. The improved combination according to claim 2, in which the movement controlling means comprises a fixed plate having two spaced sets of spaced apertures therein, an arm pivotally mounted for tilting movement between its ends on said plate between said apertures and having parts adjacent its extremities overlying opposite apertures of the two sets thereof in the opposite tilted positions of the arm, means connecting said bar to said arm to move the arm from its one tilted position to the other as the bar moves in opposite directions upon operation of the shift or unshift key, and means on each of the parts of said arm which overlie said apertures which are disposed within said apertures during the initial and final movements of said arm and which frictionally engage said plate between the apertures as the arm moves from its one tilted position to the other.

5. In the combination comprising an auxiliary keyboard for a tape-perforating machine having a keyboard having a plurality of character keys each producing the same characteristic perforation for upper case and lower case, a shift key for producing a characteristic upper case tape perforation and an unshift key for producing a characteristic lower case tape perforation, the auxiliary keyboard comprising a plurality of spring supported keys arranged in substantially the positions of the keys of a standard Linotype machine keyboard and each being marked with an upper case or lower case character, a plurality of solenoids each having a plunger and each being arranged and positioned to be operatively associated with one of the character, shift and unshift keys of the tape perforating machine to depress the associated key upon energization of the solenoid, a pair of contact members associated with each of the upper case and lower case keys of the auxilary keyboard and being positioned to be successively engaged by the associated key on depression thereof, an electric circuit including the first contact member of each pair of contact members associated with an upper case key of the auxiliary keyboard and also including the winding of the shift key solenoid, an electric circuit including the second contact member of each pair associated with an upper case key of the auxiliary keyboard and also including the winding of the solenoid associated with the corresponding character key of the tape-perforating machine keyboard, an electric circuit including the first contact member of each pair of contact members associated with a lower case key of the auxiliary keyboard and also including the winding of the unshift key solenoid, an electric circuit including the second contact of each pair of contact members associated with a lower case key of the auxiliary keyboard and also including the winding of the solenoid associated with the corresponding character key of the tape-perforating machine keyboard, means operable upon depression of either the shift or unshift key of the tape-perforating machine to de-energize the solenoid associated with the depressed shift or unshift key, means to return the depressed shift or unshift key to normal position upon de-energization of its solenoid, a source of power for said electric circuits, switch means included in the circuit of the operating solenoid of each character key of the tape-perforating machine which can produce lower case or upper case tape perforations, means for operating said switch, means operable upon depression of either the shift key or the unshift key of the tape-perforating machine to first open and then close said switch, and means to provide a time delay between the depression of the shift or unshift key and the depression of the character key, said time delay means comprising a mercury switch supported for movement from a tilted position in one direction to a tilted position in the opposite direction and having two sets of separated contacts which are connected only when said switch is in tilted position and which are connected respectively to the source of energy and to the means for operating the switch means in the circuit of the operating solenoid of each character key, and means operable upon depression of the shift or unshift key to tilt the mercury switch in one direction or the other respectively.

6. An auxiliary keyboard for a tape-perforating machine having a keyboard having a plurality of character keys each producing a characteristic perforation for upper case and lower case, a shift key for producing a characteristic upper case tape perforation and an unshift key for producing a characteristic lower case tape perforation, the auxiliary keyboard comprising a plurality of spring supported keys arranged in substantially the position of the keys of a standard Linotype machine keyboard and each being marked with an upper case or lower case character, a plurality of solenoids each having a plunger operatively associated with one of the character, shift and unshift keys of the tape-perforating machine to depress the associated key upon energization of the solenoid, a pair of contact members associated with each of the upper case and lower case keys of the auxiliary keyboard and being positioned to be successively engaged by the associated key on depression thereof, an electric circuit including the first contact member of each pair of contact members associated with an upper case key of the auxiliary keyboard and also including the winding of the shift key solenoid, an electric circuit including the second contact member of each pair of contact members associated with an upper case key of the auxiliary keyboard and also including the winding of the solenoid associated with the corresponding character key of the tape-perforating machine keyboard, an electric circuit including the first contact of each pair of contact members associated with a lower case key of the auxiliary keyboard and also including the winding of the unshift key solenoid, an electric circuit including the second contact of each pair of contact members associated with a lower case key of the auxiliary keyboard and also including the winding of the solenoid associated with the corresponding character key of the tape-perforating machine keyboard, means operable upon depression of either the shift or unshift key of the tape-perforating machine to de-energize the solenoid associated with the depressed shift or unshift key, means to return the depressed shift or unshift key to normal position upon de-energization of its solenoid, a source of power for said electric circuits, solenoid-controlled switch means in the circuit of the operating solenoid of each of the character keys of the tape-perforating machine, a time delay switch which passes current after completion of the operation of the shift or unshift key but not during operation of either of such keys, a normally-closed circuit including the source of power, the operating solenoid of said switch means and said time delay switch for maintaining said switch in closed position after completion of the operation of the shift or unshift key but not during operation of either of such keys, a bar mounted for horizontal sliding movement, means for moving said bar in one direction or the other by depression of the shift or unshift key, abutments mounted on said rod, two contact members mounted between said abutments and so positioned with respect to each other and to the abutments that they are moved into contact with each other by one or the other of the abutments at the limit of movement of the bar in either direction and are separated in other positions of the bar and which are included in said normally-closed circuit to first open and then close said time delay circuit.

7. In a keyboard of a tape-perforating machine having a shift key having a finger engaging part, and an arm supporting said key, a cylindrical member surrounding the finger engaging part of the key and having a closed end above said part and a closed end below said part, operating mechanism below the lower closed end of said cylindrical member, a compression spring between the upper closed end of the cylindrical member and the finger engaging part of the key normally supporting said cylindrical member in raised position with respect to the key, a solenoid disposed above the key and the cylindrical member and having a plunger operable downwardly into engagement with the closed end of the cylindrical member on energization of the solenoid to first compress the spring and move the cylindrical member downwardly with respect to the key and into engagement with said operating mechanism and then to depress the key.

References Cited in the file of this patent

UNITED STATES PATENTS

| | | |
|---|---|---|
| 374,883 | Van Hovenbergh | Dec. 13, 1887 |
| 1,753,991 | Langford | Apr. 8, 1930 |
| 2,014,432 | Gerhold | Sept. 17, 1935 |
| 2,569,805 | Doty et al. | Oct. 2, 1951 |
| 2,641,320 | Johnson | June 9, 1953 |
| 2,679,902 | Brewer | June 1, 1954 |